US006592034B1

(12) United States Patent
Millard et al.

(10) Patent No.: US 6,592,034 B1
(45) Date of Patent: Jul. 15, 2003

(54) TAMPER PROOF CLOSURES

(75) Inventors: Richard James Millard, Bristol (GB); David Geraint Rhys Jones, Bristol (GB)

(73) Assignees: Redcliffe Limited, Bristol (GB); Cypher Science Limited, Cardiff (GB)

( * ) Notice: Subject to any disclaimer, the term of this patent is extended or adjusted under 35 U.S.C. 154(b) by 0 days.

(21) Appl. No.: 09/674,778

(22) PCT Filed: May 7, 1999

(86) PCT No.: PCT/GB99/01426

§ 371 (c)(1), (2), (4) Date: Dec. 29, 2000

(87) PCT Pub. No.: WO99/57035

PCT Pub. Date: Nov. 11, 1999

(30) Foreign Application Priority Data

May 7, 1998 (GB) ............................................ 9809810

(51) Int. Cl.[7] ................................................ G06K 7/08
(52) U.S. Cl. ........................ 235/449; 235/450; 235/493
(58) Field of Search ................................ 235/383, 385, 235/444, 449, 451

(56) References Cited

U.S. PATENT DOCUMENTS

| | | | | |
|---|---|---|---|---|
| 4,456,139 A | * | 6/1984 | Kent | 215/252 |
| 4,661,691 A | * | 4/1987 | Halpern | 235/449 |
| 4,750,197 A | * | 6/1988 | Denekamp et al. | 379/58 |
| 5,246,124 A | * | 9/1993 | Battegazzore | 215/251 |
| 5,602,381 A | * | 2/1997 | Hoshino et al. | 235/493 |

FOREIGN PATENT DOCUMENTS

| | | | | |
|---|---|---|---|---|
| EP | 0831410 | | 3/1998 | |
| GB | 2 178 481 | | 2/1987 | |
| GB | 2178481 A | * | 2/1987 | E05G/1/10 |
| GB | 2 208 289 | | 3/1989 | |
| GB | 2220648 | | 1/1990 | |
| WO | WO 97/38364 | | 10/1997 | |

* cited by examiner

*Primary Examiner*—Michael G. Lee
*Assistant Examiner*—Ahshik Kim
(74) *Attorney, Agent, or Firm*—Connolly Bove Lodge & Hutz LLP

(57) ABSTRACT

A tamper proof closure (1) has a plurality of magnetic strips (7) attached thereto which are arranged to be broken if the closure is opened. The broken magnetic strips have a different magnetic characteristic as compared to when they are intact and this can be sensed with a Hall effect or other sensor. The tamper proof closure enables the condition of article closures such as the screw caps of liquor bottles to be remotely monitored.

14 Claims, 1 Drawing Sheet

TAMPER PROOF CLOSURES

FIELD OF THE INVENTION

This invention concerns improvements relating to tamper proof closures such as are employed to ensure that a closed product cannot be opened and interfered with in an undetectable manner.

BACKGROUND OF THE INVENTION

Many products used to be enclosed within jars and bottles for example which were provided with a closure which could be opened, thereby exposing the product to interference, and then closed without there being any means of determining that the product integrity had been prejudiced. A screw-topped jar or bottle, for example, could be opened, its contents interfered with and the screw-top replaced without there being any outward indication of what had taken place.

In part as a result of the decline in social values that seems to accompany the march of civilisation, measures have been introduced to combat the abovementioned scenario. Such measures range from the provision of integral collars which attach to a closure cap so that the attachment is inevitably broken if the cap is removed, to the provision of hermetically sealed closure caps provided with a "button" which can be depressed only if the hermetic seal has not been broken. However, despite such measures, the problem of product tampering remains, particularly where the product is of a relatively high value such as a fine malt whiskey or brandy.

In GB-A-2 178 481 there is proposed a security system for detecting tampering with or entry into containers. A part of the container surface is proposed to be coated with a paint having magnetic particles associated therewith and the drying of the paint fixes the particles into a stable pattern which can be recorded. If the pattern is disturbed by tampering with the container, the changed pattern can be detected. The system of GB-A-2 178 481 proposes that the pattern formed by the magnetic particles in the paint be recorded photographically and proposes to detect a changed pattern, indicative of tampering, by comparison of an initial photographic record with the current pattern formed by the particles. This system would produce different magnetic patterns for each container, so that detection of tampering would be an onerous task in a situation where a large number of containers were to be checked for tampering. The detection of tampering with bottles of spirits in a liquor warehouse, for example, by use of this system clearly would be wholly impractical.

The Applicants are also aware of EP-A-0 831 410 which proposes an article surveillance tag which comprises magnetic material divided into distinct detectable zones which enable coded information to be provided on the tags as a function of the zone positions and the spacing therebetween, such coded information being magnetically readable. This proposal to tag articles magnetically does not meet the requirements for a tamperproof closure.

OBJECTS AND SUMMARY OF THE INVENTION

Accordingly, it is the principal object of the present invention to provide a means of detecting tampering which is simple to use and is readily applicable to situations where the status of many articles is required to be determined.

The present invention resides in the concept of magnetic detection of product tampering by incorporation of one or more magnetic strips or other elements into a product closure in such a manner that interference with the closure will enable a change in the magnetic field signature of said strip(s)/element(s) to be detected to provide a corresponding indication.

More generally, the present invention in one of its aspects provides a method of detecting interference with the closure of an article, said method comprising providing said closure with magnetic means arranged to be disturbed when the closure is opened and sensing a change in the magnetic signature of said magnetic means resulting from the changed interaction between respective parts of the magnetic means consequent upon such disturbance.

The invention also extends to an article provided with a closure which is protected against interference by the provision of magnetic means arranged to be disturbed when the closure is opened and such that the change in magnetic signature of the article consequent upon opening of the closure and resulting from the changed interaction between respective parts of the magnetic means consequent upon such disturbance can be sensed.

In accordance with a particular embodiment of the invention, a bottle top for example is provided with one or more magnetised or magnetisable magnetic strips formed for example of bonded permanent magnet powder or incorporating the same, the strip(s) being arranged so as to be broken as the bottle is opened. The magnetic strip(s) will, once broken and with respective parts displaced across the break, give rise to a magnetic field different from that which exists in the unbroken state and this difference can be sensed magnetically. Even if an attempt is made to realign the broken ends of the strip(s), magnetic field leakage flux variation can provide an indication of tampering where the strip ends are perfectly realigned, and if the strip ends are not perfectly realigned other magnetic effects come into play which can also be detected.

The magnetic strip(s) can be preformed and applied to the product in a separate operation or alternatively could be integrally incorporated into the product closure. The magnetic strip(s) can be pre-magnetised or can be magnetised as a separate operation carried out on the product after the closure is effected, for example by passing products on a conveyor line through a magnetising station such as to establish the requisite magnetisation of the strip(s).

For detecting the effects of tampering upon the magnetic product closure, any convenient arrangement capable of response to the magnetic field(s) produced by a ruptured closure and capable of discriminating from stray magnetic fields can be employed. Hall effect and magnetoresistive magnetic sensors are known which are extremely sensitive and one or more such sensors could be employed in a suitable detector. Other sensors such as eddy current sensors, for example, are known in the art which are capable of detecting and responding to small magnetic field perturbations and any of such sensors could be employed in the practice of the present invention, particularly given the ability of magnetic strips incorporating modem magnetic materials to generate relatively high magnetic fields.

The present invention could for example be of utility in a warehouse where cases of whiskey, brandy or other premium quality consumables were stored prior to distribution. In this situation, the magnetic tamper proof closures according to the present invention could be applied to the cases themselves and/or could be applied to the individual bottles within the cases. The cases, cardboard cartons, for example, could be sealed closed and a plurality of magnetic strips provided across the closure wherever it could be opened. The closure caps of individual bottles within the cases could have adhered thereto, for example, under a covering plastics material encapsulation, a plurality of such magnetic strips. The magnetic strips could be pre-magnetised or the arrangement could be such that on entry of the cases into the warehouse they passed through a magnetising station such as to set a magnetic field on the strips. Within the warehouse, any tampering with the cases or with the bottles within the cases would give rise to disturbances in the normal magnetic state of the product and this could be sensed by means of hand-carried sensor devices, by means of detectors provided permanently in the racking system of the warehouse, and/or by means of detectors provided at the exit from the warehouse. All things are possible in this regard and the warehouse could even include appropriate screening to protect the interior of the warehouse from the effect of extraneous magnetic fields which might potentially detract from the performance of the magnetic strips and detector arrangements.

Additionally, or alternatively, magnetic anti-tamper arrangements could be based upon induced assessment of the state of unrmagnetised magnetic material, for example ferrite material. Such an arrangement could for example operate to sense the breaking of a closed loop magnetic circuit as an indication of product tampering. Resonance effects, possibly at different frequencies, could be employed.

The above and further features of the present invention are set forth in the appended claims and will become more clear from consideration of the following description given with reference to the accompanying drawings.

DETAILED DESCRIPTION OF THE EMBODIMENTS

Figure 1:
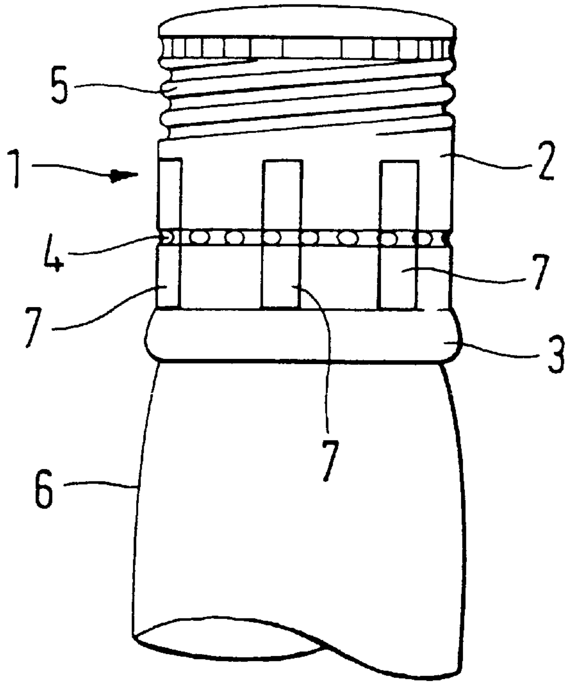
FIG. 1 is a fragmentary view showing application of the present invention to a tamper-proof bottle closure.

Referring to FIG. 1, shown therein is a side-elevation view of a conventional tamper-proof, screw top such as is commonly employed for sealing bottles of whiskey, but with the addition of magnetic strips enabling the integrity of the closure to be determined by remote sensing.

As shown the screw top 1, which is conventionally formed as a metal pressing, comprises upper and lower parts 2 and 3 respectively which are connected together by a frangible portion 4 formed for example by cutting through the metal of the top at spaced-apart locations. The upper part 2 has a screw thread 5 engageable with complementary screw threads provided on the neck 6 of the bottle and the lower part 3 is turned inwardly at its, lower edge over an outward protrusion formed on the neck of the bottle. When the bottle is opened by turning the upper part 2 of the top 1, the upper part 2 breaks away from the lower part 3 at the frangible portion 4 and can be removed, the lower part 3 remaining in place.

Shown adhered to the top 1 are a plurality of magnetic strips 7 which extend across the frangible portion 4. The magnetic strips 7 comprise self-adhesive plastics strip material having permanent magnet powder bonded thereto and are such that they will be broken as the upper part 2 of the top 1 is turned for removal. The strips 7 are strongly magnetised and have a magnetic field signature which is considerably changed when the strips are broken, even if the top 1 is subsequently replaced and even if an effort is made to align the broken ends of the strips. A covering of paper, foil or plastics for example might be provided over the top of the strips 7 so that their presence would not be apparent to the casual observer. Alternatively, the strips 7 could be made prominent so as to serve as an added deterrent to tampering.

Figure 2:
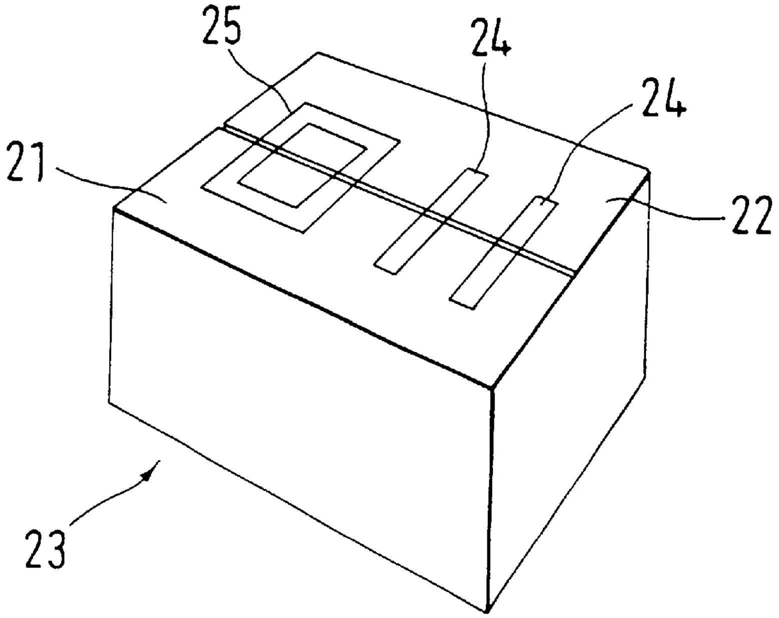
FIG. 2 is a perspective view showing application of the present invention to a cardboard carton.

FIG. 2 shows an alternative arrangement in which the flaps 21 and 22 of a carton 23 are bridged by a plurality of magnetic strips 24 and there is also provided a closed-loop strip arrangement 25 which straddles the opposed flaps 21 and 22. The strips 24 comprise an active magnetic anti-tampering deterrent in the same manner as the strips 7 in the embodiment of FIG. 1, and the closed-loop arrangement 25 comprises unmagnetised ferrite material such as to enable passive inductive assessment of the integrity of the carton closure. Again, the strips 24 and the closed-loop arrangement 25 could either be concealed or could be made prominent, possibly with the addition of an appropriate warning label on the carton.

Detection of a change in the magnetic properties of the strips 7 of the FIG. 1 embodiment and of the strips 24 and closed-loop arrangement 25 of the FIG. 2 embodiment is readily possible given that extremely sensitive magnetic field detectors are available and that the active and passive effects provided by the described arrangements can be relatively large. Hall effect or magnetoresistive magnetic field detectors can be employed for this purpose and electromagnetic coil sensors could also be used. Since the magnetic signature of a product provided with anti-tampering means according to the present invention will depend to a great extent upon the nature of the product and the arrangement of the anti-tampering means that is provided thereon, the detector could advantageously be microprocessor based with an ability to learn by experience what is to be considered in any particular application to be a normal and what an abnormal condition. For a hand-held detector, the magnetic field sensor(s) preferably might be provided at the end of a wand or the like arranged to be passed over the protected products.

Having described the invention in the foregoing by reference to specific embodiments, it is to be appreciated that the described embodiments are exemplary only and that modifications and variations thereto are possible without departure from the scope of the invention as set forth in the appended claims. For example, whereas in the foregoing the magnetic strips 7 in the embodiment of FIG. 1 and the magnetic strips 24 in the embodiment of FIG. 2 are shown as being parallel to each other, each of the strips 7 and 24 could be accompanied by a further, transversely oriented strip arranged to provide a characteristic detectable magnetic signature indicative that the closure is an authentic application of the present invention. For example, in a situation where breakage of the strips 7, 24 was designed to produce a detectable stray field, the additional transverse strips could be prearranged to provide a characteristic stray field even without tampering with the closure. If the closure has been subjected to tampering, two stray fields would be detectable as opposed to one for an untampered closure.

Yet another possibility within the ambit of the present invention would be to configure each of the magnetic material strips 7 and 24 of the described embodiments as spaced-apart magnets with their like poles in opposition and with a soft magnetic material in the gap therebetween. When no tampering has occurred and the magnets are aligned with the soft magnetic material, the soft magnetic material locates at the null point where the magnetic fields of the two magnets cancel, and the application of a varying magnetic field enables this situation to be verified. If tampering has occurred such as to displace the soft magnetic material relative to the null point, a different magnetic signature is detectable as an indication of tampering. In such an arrangement the spaced-apart magnets could be permanent magnets or their magnetism could be induced.

What is claimed is:

1. A method of detecting tampering with a cylindrical article closure, the method comprising the steps:

providing the cylindrical closure with at least one magnetic member;

providing the at least one magnetic member with a magnetic field;

opening the closure at least partially;

disturbing the magnetic member of the closure when the closure is opened, wherein disturbing the magnetic member subjects the magnetic field of the magnetic member to a change resulting from a changed interaction between respective parts of the disturbed magnetic member, and detecting the change in the magnetic field by remote magnetic sensing.

2. A method as claimed in claim 1 wherein the magnetic member is permanently magnetized.

3. A method as claimed in claim 1 wherein the at least one magnetic member comprises first and second permanently magnetized members, and wherein remote sensing comprises:

detecting a change in magnetic field of the first and second permanently magnetized members by induction.

4. A secured container for evidencing tampering and comprising:

a container;

a cylindrical closure for the container;

at least one magnetic member provided with a magnetic field and mounted on the cylindrical closure, wherein the magnetic member becomes disturbed when the closure is at least partially opened; and wherein the magnetic field of the magnetic member changes due to a changed interaction between respective parts of the disturbed magnetic member, such a change being detectable by remote magnetic sensing.

5. A container as claimed in claim 4, wherein the magnetic member is made of permanent magnet material.

6. A container as claimed in claim 5, wherein the permanent magnet material is permanent magnet powder bonded to a backing of sheet material.

7. A container as claimed in claim 4 wherein the at least one magnetic member comprises first and second permanently magnetized members, and wherein the first and second magnetic members enable sensing of a change in magnetic field by induction.

8. A container as claimed in claim 4 wherein the magnetic member is provided on the closure so that respective parts of the magnetic member will be displaced relative to each other when the closure is opened.

9. A container as claimed in claim 4 together with a sensor device for detecting a change in the magnetic field of the magnetic member.

10. The combination claimed in claim 9 wherein the sensor device comprises a Hall effect sensor.

11. The combination claimed in claim 9 wherein the sensor device comprises a magnetoresistive sensor.

12. The combination claimed in claim 9 wherein the sensor device comprises a sensing coil.

13. A method as claimed in claim 1 wherein the cylindrical closure is a threaded closure for a bottle, and wherein:

providing the cylindrical closure with at least one magnetic member comprises providing the at least one magnetic member across a frangible portion of the closure; and disturbing the magnetic member of the closure when the closure is opened comprises breaking the at least one magnetic member at the frangible portion by unscrewing the threaded closure from the bottle.

14. A container as claimed in claim 1 wherein:

the cylindrical closure is a threaded closure for a bottle;

the magnetic member is mounted across a frangible portion of the threaded closure; and the magnetic member is broken when the threaded closure is unscrewed from the bottle.

* * * * *